Aug. 7, 1951       M. SCHLUMBERGER       2,562,992

WELL LOGGING SYSTEM

Filed Oct. 29, 1946       2 Sheets-Sheet 1

INVENTOR.
MARCEL SCHLUMBERGER
BY
Campbell, Brumbaugh & Free
his ATTORNEYS.

Aug. 7, 1951 M. SCHLUMBERGER 2,562,992
WELL LOGGING SYSTEM
Filed Oct. 29, 1946 2 Sheets-Sheet 2

INVENTOR.
MARCEL SCHLUMBERGER
BY
Campbell, Brumbaugh & Free
his ATTORNEYS.

Patented Aug. 7, 1951

2,562,992

UNITED STATES PATENT OFFICE 2,562,992

WELL LOGGING SYSTEM

Marcel Schlumberger, Paris, France, assignor to Schlumberger Well Surveying Corporation, Houston, Tex., a corporation of Delaware Application October 29, 1946, Serial No. 706,334

9 Claims. (Cl. 175—182)

The present invention relates to well logging apparatus and more particularly to new and improved well logging systems by means of which the more resistive formations traversed by a bore hole may be logged with greater definition than has been possible heretofore.

In logging wells by the well known electrical resistivity methods, it is customary to make two logs known as the "normal" resistivity curve and the "lateral" resistivity curve. The former may be made with an electrode assembly comprising a pair of current-emitting electrodes spaced relatively far apart, and a potential electrode located near one of the current electrodes, and it is generally used to obtain a detailed log of beds of medium and great thickness. The "lateral" curve provides a detailed log of relatively thin beds and enables a greater lateral depth of investigation to be achieved. It may be obtained with an electrode assembly comprising a pair of current-emitting electrodes spaced relatively closely together and a potential electrode spaced a relatively great distance from one of the current electrodes.

It has been observed that the "normal" and "lateral" curves obtained in wells traversing highly resistive formations are peaked either at the top or bottom boundaries of the formations and tend to drop off as they approach the other boundary. Further, the resistivity values in the peaks of the curves tend to be somewhat exaggerated. Moreover, where the well is bottomed in a highly resistive formation, the resistivity curves either increase or decrease with the depth of the penetration into the formation, depending on the electrode arrangement. While such curves provide much useful information about the formations, they must be carefully interpreted if the boundaries of resistive formations of interest are to be located accurately and reasonably accurate apparent resistivity values are to be obtained.

The principal object of the invention, accordingly, is to provide a new and improved electrical well logging system by means of which the more resistive formations traversed by a well may be logged with greater definition than has been attainable heretofore.

Another object of the invention is to provide a new and improved well logging system of the above character which enables a more symmetrical log to be obtained of the more resistive formations traversed by a bore hole.

In accordance with the invention, a symmetrical well logging system is provided in which two pairs of electrodes are employed in a symmetrical array about a reference electrode. The two electrodes of one pair are located substantially equal distances on opposite sides of the reference electrode and the two electrodes of the other pair are located equal, greater distances on opposite sides of the reference electrode. The electrodes in each pair are electrically connected together and the two pairs are connected to the respective terminals of a source of electrical energy. The reference electrode may be connected to one terminal of a circuit including electrical recording means, the other terminal being grounded at the surface, although the same results may be obtained with the source of electrical energy and the recording means interchanged.

Tests have shown that symmetrical electrode systems of this character enable detailed and symmetrical logs of the more resistive formations traversed by a bore hole to be readily obtained.

Additional objects and advantages of the invention will be apparent from the following detailed description taken in conjunction with the accompanying drawings in which.

Figure 1:
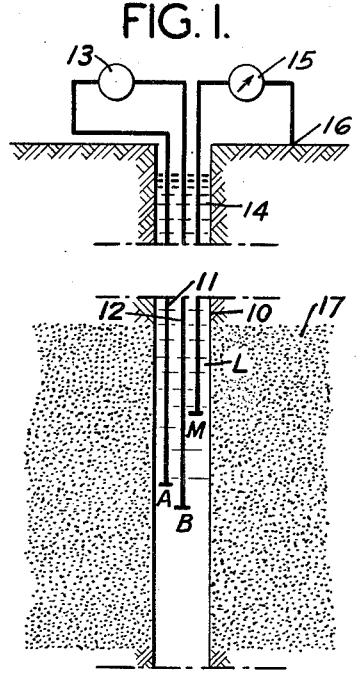
Figure 1 is a schematic diagram of a conventional well logging apparatus for obtaining a "lateral" electrical log of earth formations traversed by a bore hole.

Well logging systems for obtaining a "lateral" resistivity curve of earth formations traversed by a bore hole are well known, and are illustrated in prior Patent No. 2,317,304 to C. Schlumberger. As shown in Figure 1, such apparatus may comprise, for example, a pair of current-emitting electrodes A and B, and a potential electrode M, suitably supported to be lowered through a bore hole 10 in fixed spatial relationship to one another. The bore hole 10 will usually contain a column of conducting liquid L.

The current-emitting electrodes A and B may be connected by the conductors 11 and 12 in a supporting cable (not shown) to a suitable source of electrical energy 13 located at the surface of the earth. While a direct current source may be used, it is usually preferred to use an alternating current source in order that the potential electrode M may be used to pick up naturally occurring potentials in the bore hole in addition to potentials related to the resistivity of the formations. The potential electrode M may be connected by another conductor 14 in the supporting cable to one terminal of a conventional indicating or recording instrument 15, the other terminal of which may be grounded at a point 16 at the surface of the earth.

As illustrated in the aforementioned Patent No. 2,317,304, the electrode B should be spaced relatively close to the electrode A, while the electrode M should be spaced a greater distance from the electrodes A and B, for obtaining a "lateral" curve. Spacings of about 8 inches between the electrodes A and B and 56 inches between the electrodes A and M have been found satisfactory for recording detailed logs of very thin beds and, also, for logging at a relatively great lateral depth of investigation.

Figure 2:
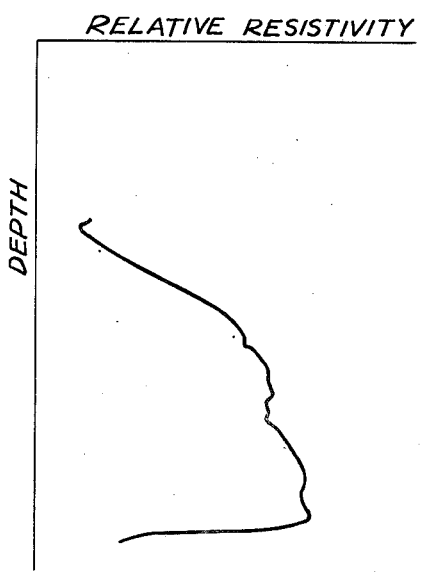
Figure 2 is a curve illustrating the type of log obtained in the vicinity of a highly resistive formation with the apparatus shown in Figure 1.

If the well logging system shown in Figure 1 is lowered through the bore hole 10 past a highly resistive formation 17, such as limestone, for example, the thickness of which is greater than the overall length of the electrode system, the log recorded by the instrument 15 will have the general shape shown in Figure 2. It will be noted from Figure 2 that the curve does not delineate the formation 17 in great detail. Also, its magnitude is relatively small at the top boundary of the formation 17 and it rises to a peak value at the bottom boundary of the formation 17. The peaked portion of the curve indicates a somewhat exaggerated value of apparent resistivity for the formation 17.

Figure 3:
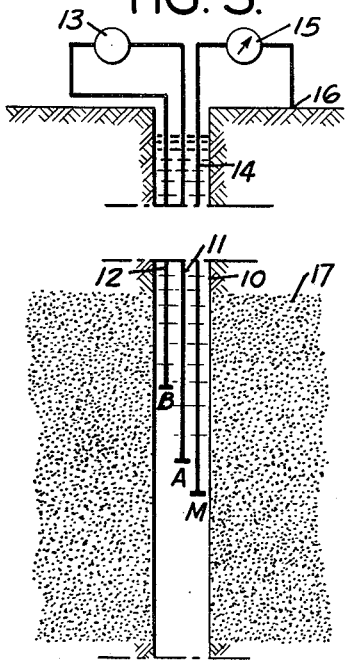
Figure 3 is a schematic diagram illustrating a conventional apparatus for obtaining a "normal" electrical log in a well.

Figure 3 illustrates conventional apparatus for obtaining a "normal" log of subterranean earth formations. Apparatus of this type is also well known, and is disclosed in prior Patent No. 2,317,259 to H. G. Doll. Referring to Figure 3, the potential electrode M is located relatively close to the current-emitting electrode A, and the current-emitting electrodes A and B are spaced relatively far apart. A suitable spacing for logging beds of medium and of great thickness is about 8 inches between the electrodes M and A, and about 56 inches between the electrodes A and B.

Figure 4:
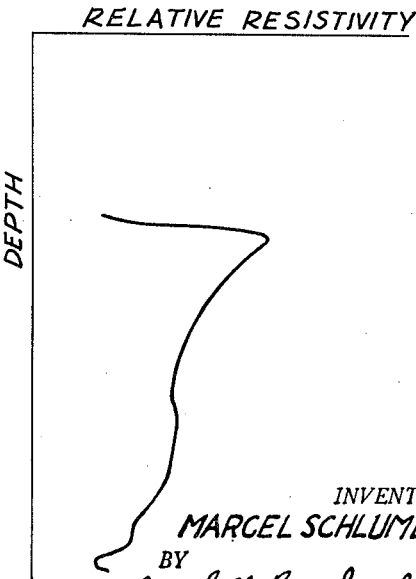
Figure 4 is a curve illustrating the type of a log recorded by the apparatus of Figure 3 in the vicinity of the same highly resistive formation shown in Figure 1.

When a "normal" well logging system of the type shown in Figure 3 is lowered through the bore hole 10 past the highly resistive formation 17, a log of the type shown in Figure 4 is obtained. As shown in Figure 4, the curve rises to a peak value at the upper boundary of the formation 17 and falls off to a lesser magnitude at the bottom boundary. Again, the apparent resistivity as obtained from the peaked portion of the curve is somewhat exaggerated.

Figure 5:
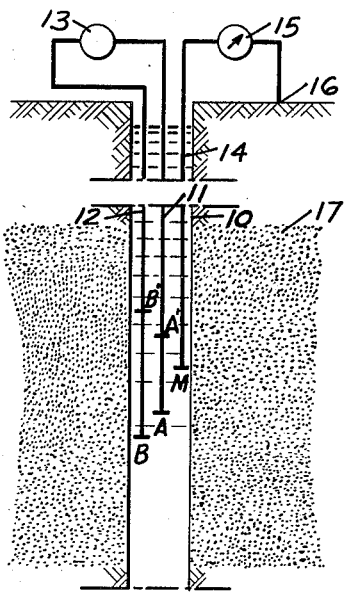
Figure 5 is a schematic diagram of a symmetrical well logging system constructed according to the invention.

In Figure 5 is shown a symmetrical well logging system constructed according to the present invention, in which an additional pair of current electrodes A' and B' are disposed in the bore hole with the electrodes A, B and M. The eelctrode A' is electrically connected to the electrode A, and is preferably disposed the same distance above the electrode M as the electrode A is below the electrode M. Similarly, the electrode B' is electrically connected to the electrode B and is preferably located the same distance above the electrode M as the electrode B is below the electrode M. Good results have been obtained with spacings of 8 inches, 60 inches, 60 inches and 8 inches between the electrodes B, A, M, A' and B', respectively. The spacing between the electrodes is not critical, however. The conductors 11 and 12 should be electrically insulated, so that current flows only between the electrodes A' and B' and the electrodes A and B.

Figure 6:
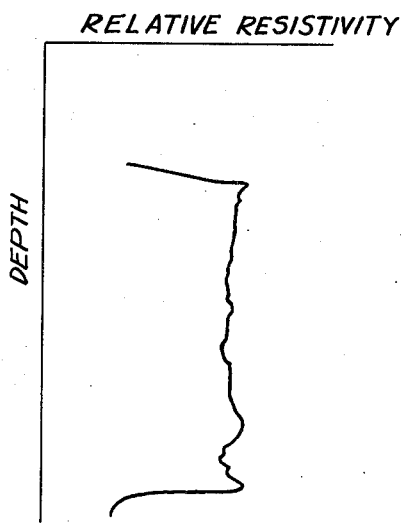
Figure 6 is a curve illustrating the type of log that may be obtained with the well logging system of Figure 5 in the vicinity of the same highly resistive formation shown in Figure 1.

When a symmetrical electrode assembly of the type shown in Figure 5 is lowered through the bore hole 10 past the highly resistive formation 17, a log of the type shown in Figure 6 is obtained. As shown in Figure 6, the log clearly defines the upper and lower boundaries of the formation 17 and gives considerable detail about the formation at different levels between the upper and lower boundaries. Further, the log is substantially symmetrical and the apparent resistivity recorded at the upper and lower boundaries of the formation is not exaggerated. It will be readily apparent that a log of the type shown in Figure 6 may be more readily interpreted than either of the logs shown in Figures 2 and 4 which are obtained by conventional well logging apparatus.

A theory has been evolved which explains, generally, the appearance of the logs shown in Figure 6. It is known that, in either a "normal" or a "lateral" well logging system, the non-symmetrical curve obtained in passing through highly resistive formations is due to the electrode configuration. When the two electrodes connected to the same circuit (current-emitting or potential measuring) lie below the reference electrode (potential measuring or current-emitting, respectively) as shown in Figure 1, the log is peaked at the lower boundary of the formation 17 as shown in Figure 2. On the other hand, when the reference electrode (potential measuring or current-emitting) lies below the two electrodes connected to the same circuit (current-emitting or potential measuring, respectively) as shown in Figure 3, the log tends to be peaked at the upper boundary of the formation 17 as shown in Figure 4.

By connecting the electrodes A' and B' electrically to the electrodes A and B in Figure 5, a composite, substantially symmetrical curve is obtained which appears to be substantially the average of the two oppositely peaked curves that would be obtained if separate logs were made with electrode systems in which the potential electrode follows and precedes, respectively, the current-emitting electrodes, or with a reciprocal system in which a current-emitting electrode follows and precedes, respectively, the potential electrodes.

Figure 8:
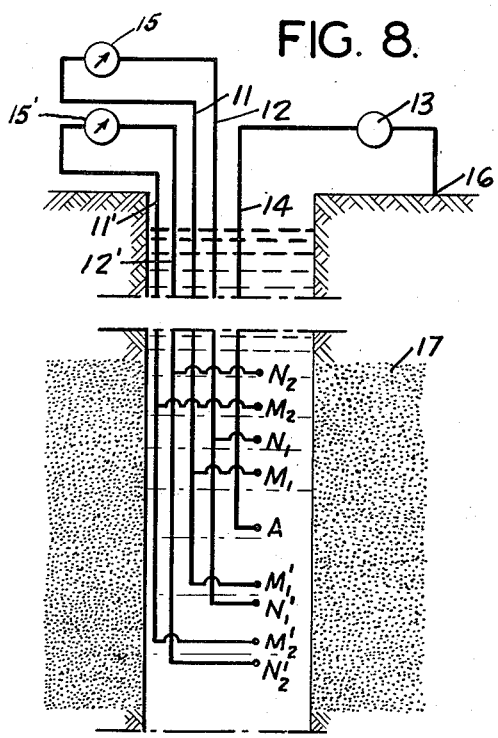
Figure 8 is a schematic diagram of a further embodiment of the invention for providing logs of apparent resistivity at two different, lateral depths of investigation.
Figure 7:
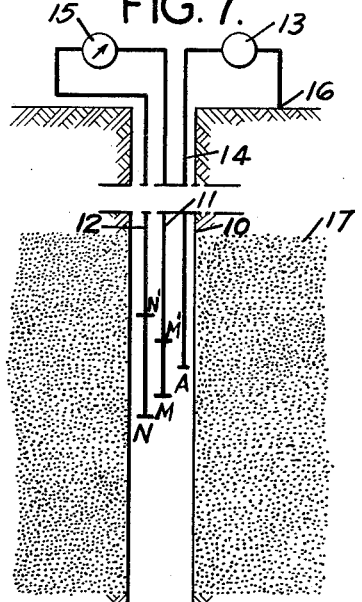
Figure 7 is a schematic diagram of another symmetrical well logging system constructed according to the invention.

It will be obvious to those skilled in the art that the source of electrical energy 13 and recording means 15 may be inter-changed, as shown in Figure 7, without modifying the type of log obtained. It can be shown by the reciprocity theorem that the two arrangements are electrically identical insofar as the electrical log obtained is concerned.

Where it is desired to obtain logs of formation resistivities at several different lateral depths of investigation, the apparatus shown in Figure 8 may be employed. This apparatus is essentially the same as that shown in Figure 7 except that additional pairs of potential electrodes $M_2M_2'$ and $N_2N_2'$ are symmetrically disposed with respect to the current-emitting electrode A and at greater distances therefrom than the electrodes $M_1M_1'$ and $N_1N_1'$. The electrodes $N_2M_2$ and $N_2'M_2'$ are electrically connected in parallel as shown and by the conductors 11' and 12' to another indicating or recording instrument 15' located at the surface of the earth. Thus the instruments 15 and 15' provide logs of the apparent resistivity of the formations at two different, lateral depths of investigation.

The invention thus provides an improved well logging system which is of special utility in the logging of highly resistive formations, such as limestone, for example. By disposing current-emitting electrodes symmetrically above and below a potential electrode, or potential electrodes symmetrically above and below a current-emitting electrode, more detailed and symmetrical logs of highly resistive formations may be obtained than has been possible heretofore.

While several specific embodiments have been described above in detail, the invention is not intended to be limited thereto, but is susceptible of numerous changes in form and detail within the scope of the following claims.

I claim:

1. In a well logging system, the combination of a first electrode adapted to be moved through a well, a pair of electrodes disposed on opposite sides of said first electrode for movement in fixed space relation therewith, a first electrical circuit having a terminal connected to said pair of electrodes and another terminal connected to a reference point, a second electrical circuit, independent of said first circuit, having a terminal connected to said first electrode and another terminal connected to a reference point, a source of electrical energy in one of said electrical circuits, and electrical recording means in the other of said electrical circuits.

2. In a well logging system, the combination of a first electrode adapted to be moved through a well, pairs of electrodes disposed on opposite sides of said first electrode for movement in fixed space relation therewith, a first electrical circuit having one terminal connected to the outermost electrode of each pair and having another terminal connected to the innermost electrode of each pair, a second electrical circuit having a terminal connected to said first electrode, a source of electrical energy in one of said electrical circuits, and electrical recording means in the other of said electrical circuits.

3. In a well logging system, the combination of a first electrode adapted to be moved through a well, a pair of electrodes disposed fixed distances on opposite sides of said first electrode and moveable therewith, a second pair of electrodes disposed greater fixed distances on opposite sides of said first electrode and moveable therewith, a first electrical circuit having one terminal connected to the electrodes comprising one of said pairs and having a second terminal connected to the electrodes comprising the other of said pairs, a second electrical circuit having a terminal connected to said first electrode and another terminal connected to a reference point, a source of electrical energy in one of said electrical circuits, and electrical recording means in the other of said electrical circuits.

4. In a well logging system, the combination of a potential electrode adapted to be moved through a well, a pair of current-emitting electrodes disposed relatively great, fixed distances on opposite sides of said potential electrode and moveable therewith, a second pair of current-emitting electrodes disposed slightly greater, fixed distances on opposite sides of said potential electrode and moveable therewith, a source of electrical energy having one terminal connected to one of said pairs of electrodes and having another terminal connected to the other pair of electrodes, and electrical recording means connected between said potential electrode and a ground point.

5. The method of logging geological formations traversed by a bore hole which includes the steps of producing an electric field between a point movable in said bore hole and a fixed point near said bore hole, and measuring the electrical potential between a first and a second pair of electrically connected positions, each pair being placed symmetrically about said movable point.

6. The method of logging geological formations traversed by a bore hole which includes the steps of producing an electric field between a first and a second pair of electrically connected positions, each pair being placed symmetrically about a point movable in said bore hole, and measuring the electrical potential between said movable point and a fixed point near said bore hole.

7. A method for logging geological formations traversed by a bore hole which comprises creating an electric field in said formations by emitting an electric current through an electrode lowered in said bore hole, positioning two electrodes symmetrically with respect to said current emitting electrode, averaging the potentials picked up by each of the symmetrically positioned electrodes, and measuring said average potential with respect to a reference position.

8. A method for logging geological formations traversed by a bore hole which comprises creating an electric field in said formations by emitting an electric current through an electrode lowered in said bore hole, positioning a first pair of electrodes symmetrically with respect to said current emitting electrode, positioning a second pair of electrodes symmetrically with respect to said current emitting electrode and at a greater distance therefrom than said first pair of electrodes, averaging the potentials picked by each pair of symmetrically positioned electrodes, and measuring the potential difference between said pairs of electrodes.

9. A method for logging geological formations traversed by a bore hole which comprises creating an electric field in said formation by emitting an electric current between a first and a second pair of electrodes lowered into said bore hole, while maintaining the electrodes of each pair at the same potential, positioning said first pair of electrodes symmetrically with respect to an auxiliary electrode, positioning said second pair of electrodes symmetrically with respect to said auxiliary electrode and at a greater distance therefrom than said first pair of electrodes, whereby the electromagnetic field produced in the vicinity of said auxiliary electrode is a function of the average current emitted by the electrodes of each pair of electrodes, and measuring the potential picked up by said auxiliary electrode with respect to a reference position.

MARCEL SCHLUMBERGER.

REFERENCES CITED

The following references are of record in the file of this patent:

UNITED STATES PATENTS

| Number | Name | Date |
|---|---|---|
| 1,841,976 | Nichols et al. | Jan. 19, 1932 |
| 2,206,892 | Hawley | July 9, 1940 |
| 2,220,788 | Lohman | Nov. 5, 1940 |
| 2,278,506 | Zuschlag | Apr. 7, 1942 |
| 2,347,794 | Piety | May 2, 1944 |
| 2,428,034 | Nichols et al. | Sept. 30, 1947 |